(12) United States Patent
Zhang

(10) Patent No.: US 8,213,433 B2
(45) Date of Patent: Jul. 3, 2012

(54) METHOD AND SYSTEM FOR ENSURING QOS AND SLA SERVER

(75) Inventor: Xiaoli Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 12/234,480

(22) Filed: Sep. 19, 2008

(65) Prior Publication Data

US 2009/0010264 A1  Jan. 8, 2009

Related U.S. Application Data

(63) Continuation of application No. PCT/CN2007/000903, filed on Mar. 20, 2007.

(30) Foreign Application Priority Data

Mar. 21, 2006 (CN) .......................... 2006 1 0066033

(51) Int. Cl.
H04L 12/28 (2006.01)
(52) U.S. Cl. ............................. 370/395.21; 370/395.43
(58) Field of Classification Search .............. 370/395.21
See application file for complete search history.

(56) References Cited

U.S. PATENT DOCUMENTS

| 6,201,971 | B1 | 3/2001 | Purnadi et al. | |
| 6,522,733 | B1* | 2/2003 | Cook | 379/112.06 |
| 6,556,824 | B1 | 4/2003 | Purnadi et al. | |
| 6,976,090 | B2* | 12/2005 | Ben-Shaul et al. | 709/246 |
| 7,010,305 | B2 | 3/2006 | Immonen et al. | |
| 7,197,038 | B1* | 3/2007 | Cook | 370/400 |
| 7,664,081 | B2* | 2/2010 | Luoma et al. | 370/338 |
| 2001/0044893 | A1* | 11/2001 | Skemer | 713/153 |
| 2002/0039897 | A1 | 4/2002 | An | |
| 2002/0132611 | A1 | 9/2002 | Immonen et al. | |
| 2002/0198850 | A1 | 12/2002 | Grande et al. | |
| 2005/0071458 | A1 | 3/2005 | Fisher et al. | |
| 2006/0248118 | A1* | 11/2006 | Curtis et al. | 707/104.1 |

FOREIGN PATENT DOCUMENTS

CN  1450749 A  10/2003

OTHER PUBLICATIONS

State Intellectual Property Office of the People's Republic of China, First Examination Report in Chinese Patent Application No. 200610066033.1 (Oct. 10, 2008).

(Continued)

*Primary Examiner* — Dang Ton
*Assistant Examiner* — Brian O Connor
(74) *Attorney, Agent, or Firm* — Leydig, Voit & Mayer, Ltd.

(57) ABSTRACT

A method and system for ensuring QoS in a communication network and a SLA server. The system for ensuring QoS includes a service-specific server and a SLA server. The method for ensuring QoS includes: querying the SLA information according to a user identity, where the SLA information includes different service levels signed by the same user identity; obtaining different service levels signed by the same user identity; and providing the user with the service at a corresponding service level. Through the technical solution of the present invention, a user can subscribe to more than one service level and the SP can ensure the QoS at different service levels for the user.

17 Claims, 5 Drawing Sheets

OTHER PUBLICATIONS

State Intellectual Property Office of the People's Republic of China, Second Examination Report in Chinese Application No. 200610066033.1 (Mar. 13, 2009).

State Intellectual Property Office of the People's Republic of China, Written Opinion of the International Searching Authority in International Patent Application No. PCT/CN2007/000903 (Jul. 5, 2007).

* cited by examiner

METHOD AND SYSTEM FOR ENSURING QOS AND SLA SERVER

CROSS-REFERENCE TO RELATED APPLICATION

This application is a continuation of International Patent Application No. PCT/CN2007/000903, filed Mar. 20, 2007, which claims priority to Chinese Patent Application No. 200610066033.1, filed Mar. 21, 2006, each of which is hereby incorporated by reference in its entirety.

FIELD OF THE INVENTION

The present invention relates to a technology for ensuring communication network resources, and in particular, to a method and system for ensuring the quality of service (QoS) of a network according to a service level agreement (SLA) in a communication network, and a SLA server.

BACKGROUND OF THE INVENTION

In a communication network, a SLA is signed between a service provider (SP) and a user to ensure the quality of communication services. The SLA is a formal agreement, through which the SP provides differentiated services for the user. The SP ensures the QoS to fulfill the SLA, and compensates or gives a discount to the user when the QoS is violated, namely, the QoS does not meet the requirements specified in the SLA. In the SLA, the user may subscribe to QoS at different levels, for example, platinum, gold, silver or bronze, and subscribe to the corresponding tariff. When the user enjoys the service at a specific level provided by the SP, the user needs to pay according to the payment terms specified in the SLA.

In practice, one user may need services at different levels in different scenarios. For example, after subscribing to a virtual private network (VPN) service, an enterprise user usually needs to ensure a high level of service in the business hours to ensure normal business operations, and intends to pay a higher tariff for the service; in non-business hours, the enterprise user usually needs a lower level of service to perform ordinary activities, and intends to pay a relatively lower tariff. Moreover, in the digital telephone services, an individual may expect cheap services rather than a high level of service because a moderate packet loss ratio and a moderate call drop ratio are tolerable in an ordinary conversation. On some important occasions, for example, telephone banking for ordering goods, and an important conference call, the user expects a relatively higher level of service and intends to pay a higher tariff. Therefore, it is necessary to provide QoS at different levels and provide the corresponding SLA assurance.

In the related art, the technical solution to providing multi-level QoS for a user and providing the corresponding SLA assurance is: When a user requires multi-level QoS for the same service, the SP signs multiple independent SLAs with the user for each required service level. Such SLAs are not correlated, and are usually signed by different user identities. A specific user identity is used for a service at a specific level, and the user enjoys the service specified by the corresponding SLA.

In the technical solution of the related art, the user signs different SLAs for the same service. Because the user identities are independent and not correlated, the user may pay for the same service at different levels repeatedly. For example, in the email service, if a user applies for a platinum mailbox and an ordinary mailbox, the user may have to pay for the two mailboxes for the same email service. Generally, if the user requires a higher level of service, the user chooses to pay only a higher tariff (for example, a platinum mailbox) rather than enjoying services at multiple levels.

Furthermore, the user is unable to switch between the service levels corresponding to the independently signed SLAs. Generally, a user must select a specific user identity at the beginning of enjoying a specific service, and accept the service level corresponding to the SLA signed by the user identity. For example, in the email service in the related art, a user is unable to send important business emails through a higher service level at a higher tariff and send less important emails through a lower service level at a lower tariff to reduce the corresponding service expense.

Moreover, to obtain multiple levels of service, a user must have multiple independent identities for signing multiple independent SLAs, or even purchase multiple service terminals or resources, thus increasing the expenses. For example, to apply for a platinum service level and a bronze service level in the digital telephone service, a user may need two different telephone numbers.

Therefore, a solution is required to enable a user to subscribe to more than one service level with the same user identity, and to ensure the QoS at different levels for the user.

SUMMARY OF THE INVENTION

Embodiments of the present invention provide a method and system for ensuring QoS in a communication network, and a SLA server so that a user can subscribe to more than one service level with the same user identity and that the SP can ensure different service levels for the user.

A method for ensuring QoS provided in an embodiment of the present invention includes: querying SLA information according to a user identity, where the SLA information includes different service levels signed by the same user identity; obtaining different service levels signed by the user identity; and providing the user with the service at a corresponding service level signed by the user.

A system for ensuring QoS provided in an embodiment of the present invention includes: a service level agreement (SLA) server, adapted to query the SLA information according to a user identity, where the SLA information includes different service levels signed by the same user identity; and obtain different service levels signed by the user identity; and a service-specific server, adapted to notify the SLA server upon receiving a service request from a user, receive the service levels from the SLA server, and provide the user with the service at a corresponding service level.

A SLA server provided in another embodiment of the invention includes: a user interface module, adapted to receive user identities; and a querying module, adapted to query SLA information according to a user identity from the user interface module, where the SLA information includes different service levels signed by the same user identity; and obtain different service levels signed by the user identity.

Embodiments of the present invention provide a user with at least one optional service level, implement smooth switching between multiple service levels, and ensure QoS at different service levels for the user, thus improving the user satisfaction. Through the system and the method of the present invention, a user can subscribe to multiple service levels and sign a SLA with a SP, switch between the service levels periodically or in real time through an interface, enjoy the service at different levels as required, and pay the corresponding tariff.

Moreover, the technical solution of the present invention enhances the competitiveness and increases revenues of the SP. In the embodiments of the present invention, one user identity corresponds to at least one service level, thus reducing waste of terminal or network resources caused by use of multiple user identities in the prior art, and reducing costs. On the basis of limited network resources, a SP may provide high-quality services for a user who most requires high-level services currently and charge a higher tariff, thus improving competitiveness and revenues while improving user satisfaction.

BRIEF DESCRIPTION OF THE DRAWINGS

The present invention is hereinafter described in detail with reference to embodiments and accompanying drawings. It should be understood that although the invention has been described through some exemplary embodiments, the invention is not limited to such embodiments. Among the drawings.

DETAILED DESCRIPTION OF THE INVENTION

The embodiments of the present invention provide a method and system for ensuring multiple SLA-based service levels for a user. As required, the user can use a unique user identity to subscribe to multiple service levels by signing a SLA, in which the same service needs only one set of user service terminals and resources; during the use of service, the user can switch between service levels in the signed SLA as required, and pay a tariff for the actually received service level and QoS according to the SLA. The user may specify different service levels for different time segments in the periodical mode; or interact with the SP through an interface provided by the SP during the use of service in real time to determine the service level; or control the service level by combining the periodical mode and the real-time mode.

In the embodiments of the present invention, the user may sign multiple SLAs for a service to obtain multiple levels of service; or the SP provides more than one service level specific to a service, and opens such service levels to all of the users. Among such levels, the SLA parameter values at the same level are unified. The user does not need to specify multiple SLA parameter values when signing a SLA. During the use of service, however, the user may select a specific service level as required, and pay the corresponding tariff.

Figure 1:
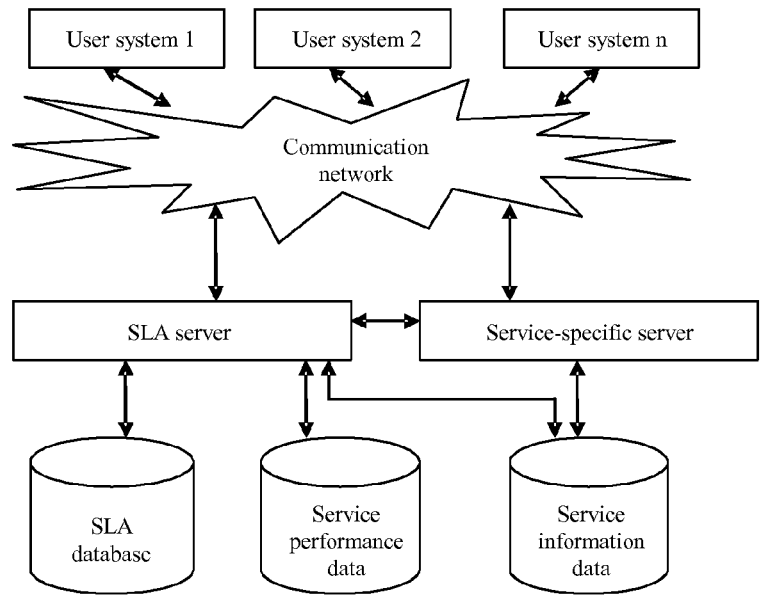
FIG. 1 simply illustrates the architecture of a system provided in a first embodiment of the invention.

FIG. 1 simply illustrates the architecture of a system provided in the first embodiment of the invention. As shown in FIG. 1, the system includes a SLA server, a service-specific server, a SLA database, a service performance database, a service information database, and a user system.

The SLA server is adapted to provide the functions related to the SLA of a user.

The service-specific server consists of one or more servers, and is adapted to provide the functions related to the services of a SP; this service-specific server includes, without limitation to: a content server, a charging server, and a service management server. In this embodiment, the service-specific server provides an interface for interacting with the SLA server, sending a message to the SLA server to trigger the SLA service performance monitoring process when the user starts a service, receiving information about the change of a user service level or SLA violation information sent by the SLA server, and handling accordingly.

The SLA database is adapted to store one or more SLAs signed between the SP and the user through negotiation.

The service performance database is optional and is adapted to store the service performance information of the current communication network. Such information may be collected from every network element (NE) in a network through a performance collection device. Such information may be used for SLA monitoring and SLA evaluation, and may be a basis for service charging and compensation upon SLA violation. The user may query such information through a uniform user interface provided by the SLA server.

The service information database is optional and is adapted to store service-related information, for example, information about the change of a user service level during the use of service, and the time of using the service, and information about switching between service levels. Such information may be a basis for service charging and SLA violation evaluation, and can be searched by the user system through the SLA server.

The user system is adapted to interact with the service-specific server to receive services, and interact with the SLA server to change the service level and query the service performance information. The user system includes a series of user hardware and/or software; the user system provides, without limitation: interfaces and modules to interact with the service-specific server to obtain services, and interfaces and modules to interact with the SLA server to perform SLA operations. The user hardware includes, without limitation to: personal computer (PC), mobile terminal, personal digital assistant (PDA), and digital telephone set; and the software includes, without limitation: operating system, browser, specific client software such as QQ and MSN.

Figure 6:
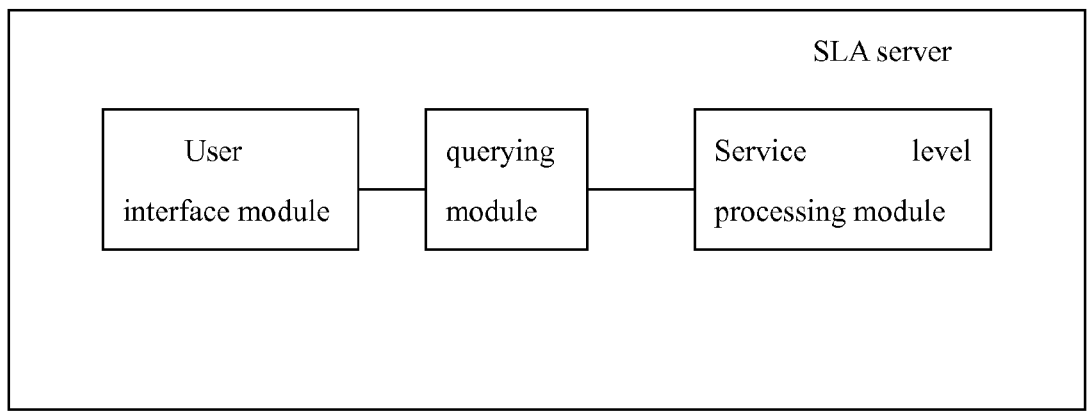
FIG. 6 simply illustrates the architecture of a SLA server provided in an embodiment of the invention.

As shown in the FIG. 6, the SLA server includes, without limitation: a user interface module, a querying module, a service level processing module, an information management module, and a SLA monitoring and evaluation module.

The user interface module, namely, a uniform user interface, is adapted to provide a uniform user-oriented interface. Through this interface module, the user changes the current service level, and changes the SLA-related parameters as permitted by the SP.

The querying module is adapted to query the SLA information that the user subscribes to according to the user identity received by the user interface module, and obtain the service level. The SLA information specific to one user may include only one SLA, and each SLA includes different service levels. The SLA information may include more than one SLA, and each SLA includes only one service level. If the user's SLA information and service level information are stored on the SLA database, the querying module interacts with the SLA database to obtain the SLA information and the service level corresponding to the user identity.

The service level processing module is adapted to detect information about the change of a service level that the user subscribes to in the SLA, detect the service level change request sent by the user through the uniform user interface, analyze and handle the service level change request, record the service level change information into the service information database when a service level is changed, and notify the service-specific server to provide services according to the new service level.

The information management module is adapted to manage and maintain the SLA database, service performance database, and service information database.

The SLA monitoring and evaluation module is adapted for SLA monitoring and SLA evaluation, and specifically, adapted to collect service performance information from the service performance database, handle and store the service performance information, obtain the QoS indexes, and detect a SLA violation according to the QoS and the SLA comparative analysis, and if any violation is detected, report the violation, or trigger the corresponding preset process.

Figure 2:
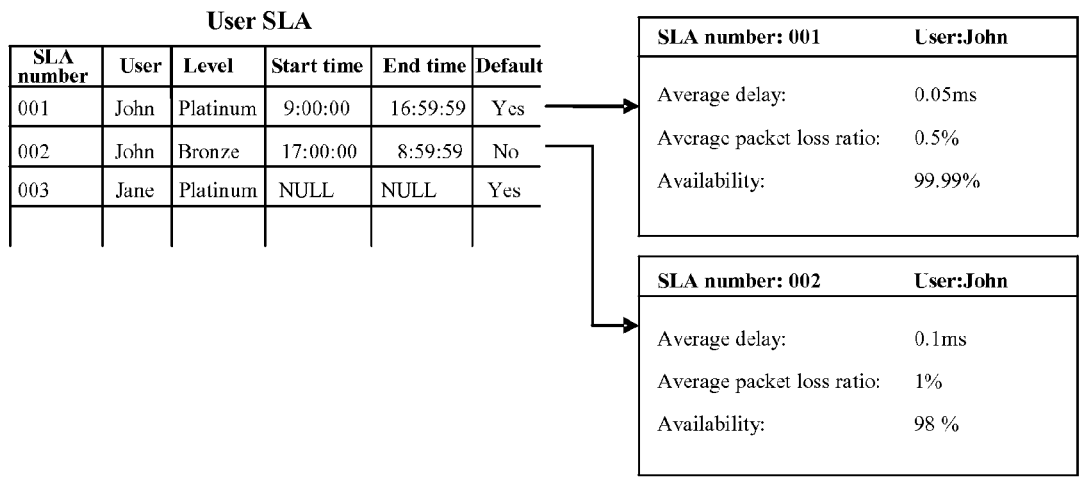
FIG. 2 simply illustrates the SLA information of a user in an embodiment of the present invention.

The SLA database stores the user's SLA information. FIG. 2 shows an instance of the SLA information of a user. In the instance shown in FIG. 2, the SLA information of the same user includes two SLAs, which means that one user signs at least one SLA. SLA information may be signed in either of these modes: (1) One user signs only one SLA; when requiring multiple levels of service, the user sets parameter values of at least one service level in this SLA; and (2) a user signs multiple SLAs for different service levels with the same user identity, and each SLA corresponds to a service level. SLA information may also be signed in other modes. In a word, in embodiments of the present invention, different levels of service are provided for the same user through different SLAs or different SLA parameters. Different SLAs of the same user, and different SLA parameters of the same SLA include: different parameters related to technologies, different parameters related to services, different parameters unrelated to technologies or services, or a combination thereof.

For ease of description, in the technical solution shown in FIG. 2, the SLA information of the same user includes multiple SLAs, namely, the SLA parameters of multiple service levels are attributable to multiple SLAs. As shown in FIG. 2, user "John" subscribes to multiple levels of services with the SP, for example, platinum services and bronze services, as shown in the figure; for each different service level, the user may set different SLA parameter values (refer to service parameters with SLA "001" and SLA "002" on the right side of FIG. 2), tariff, and QoS violation handling information through negotiation with the SP. In the specific implementation process, such service levels may be signed in one SLA; or multiple SLAs are signed separately for different service levels, and the SLA database stores the SLAs with a user identity (for example, ID card number of the user) correlatively.

The user may choose to enjoy a level of service included in a signed SLA for a certain time segment. As shown in FIG. 2, user "John" may choose to use a platinum service for 9:00-17:00 and pay a platinum tariff, and use a bronze service in other time segments and pay a bronze tariff. The user may interact with the SLA server through an interface provided by the SP (for example, website, and telephone operation as instructed by a voice prompt) to change the time segment of a service level. The technicians in this field may infer that the foregoing process of changing a service level should include a proper security authentication process and other processes required for changing a service level.

During the use of services, the user may interact with the SLA server through an interface provided by the SP (for example, website, telephone operation as instructed by a voice prompt and a related interface in a client program) to set or change the service level. In a pre-signed SLA, the user may specify a default service level for a service. Generally, the SP provide services for the user according to the default service level, and provide services and calculate charges according to the changed service level after the user changes the service level by interacting through an interface. The foregoing default service level is subject to prior negotiation with respect to the foregoing specific services, and should be specified in the SLA. The user may change the foregoing default service level through an interface provided by the SP. Technicians in this field may infer that the foregoing process of changing a service level should include a proper security authentication process and other processes required for changing a service level.

The two solutions mentioned above, namely, providing different service levels by time segments, and changing the service level through real-time interaction, may be applied separately or combined. If the two solutions are combined, the user may or may not specify a service level for a specific time segment as required. If the user specifies a service level for a specific time segment, the default service level in a time segment is the service level specified by the user for the time segment. If the user does not specify a service level for a specific time segment, the default service level in a time segment is the default service level specified in advance by the user (for example, by signing a SLA). Even if the user specifies a default service level for a specific time segment, the user may also change the service level in real time by interacting with the SLA manager through an interface provided by the SP. In practice, the following convention may apply: If the service level specified by the user in real time conflicts with the service level assigned to a time segment, the service level specified in real time shall prevail. Alternatively, the service level assigned to a time segment may prevail (hereinafter, this mode is also referred to as periodical mode). In a preferred embodiment, however, the service level specified in real time is preferred. For example, a user specifies a platinum service for 17:00-18:00, specifies a silver service for 18:00-19:00, and specifies a bronze service for other time segments. During the use of services, if the user changes the service level to bronze at 17:50, then at 18:00, the system detects the request for switching to the silver service, and decides whether to provide the silver service assigned to 18:00-19:00 or continue with the bronze service specified by the user at 17:50 according to the convention. The convention may be signed in the SLA through negotiation, or decided according to the internal service features and stipulations of the SP, and even modified by the user through an interface provided by the SP. For example, the user may switch from the real-time mode to the periodical mode by interacting through an interface.

The method provided in an embodiment of the present invention may set different service levels for one user. The network may change the service level as required by the user during the use of services, or change the service level automatically according to a preset policy (for example, set a different service level for a specific time segment).

Figure 3:
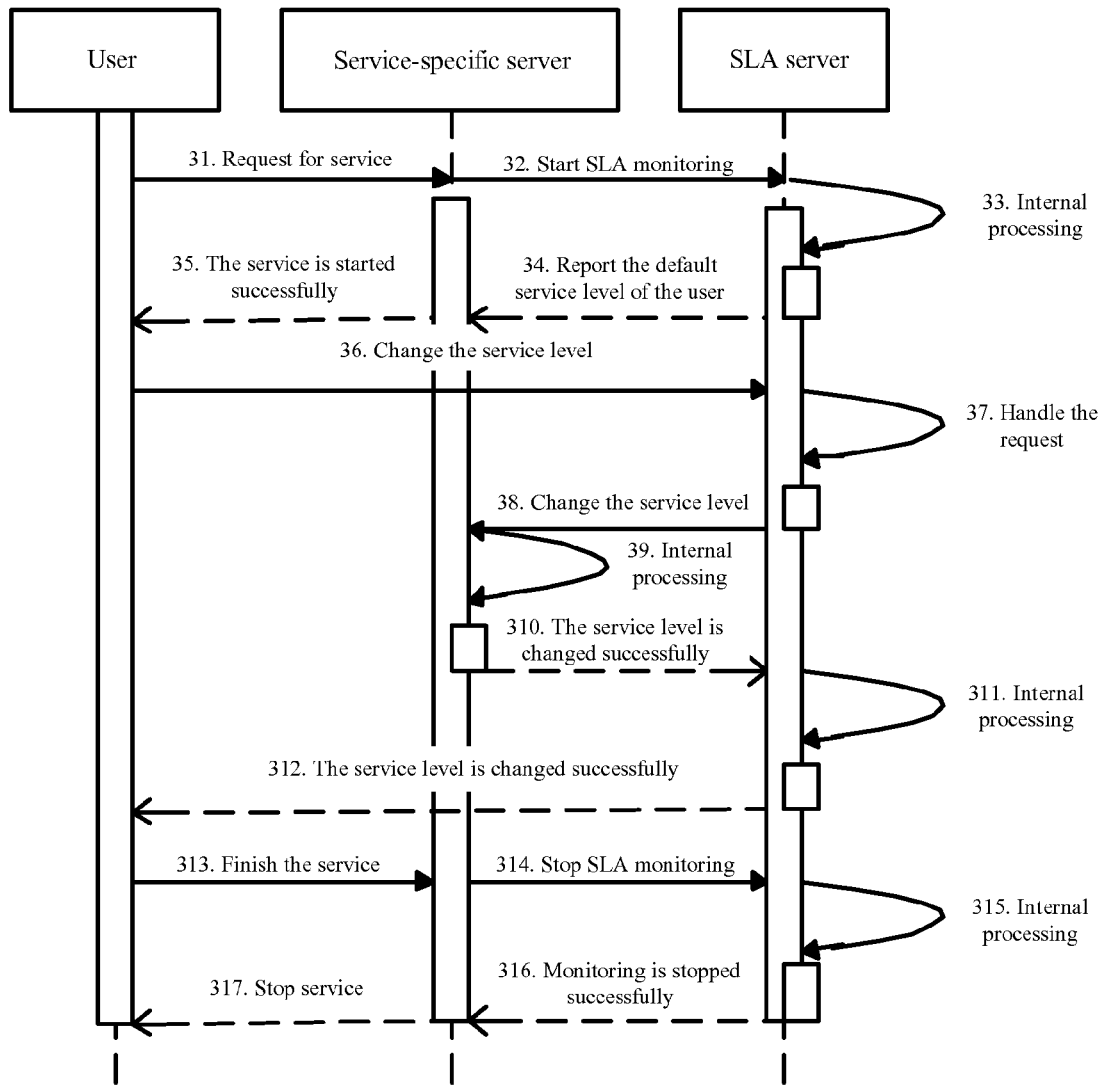
FIG. 3 is a flowchart of the method provided in a second embodiment of the invention.

The method according to the second embodiment of the present invention is about a scenario where the user requests to change the service level during the use of services. FIG. 3 is a flowchart of the method provided in the second embodiment of the invention. The detailed procedure is as follows:

Step 31: The user interacts with the service-specific server through the user system, and requests a service successfully.

Step 32: After receiving a service request message from the user, the service-specific server sends a message for starting SLA monitoring to the SLA server, carrying the user identity.

Steps 33-35: After receiving the message for starting SLA monitoring, the SLA server performs internal processing, including: According to the user identity, the SLA server retrieves the user's SLA information from the SLA database and determines the current service level of the user; according to the SLA parameters in the user's service level, starts the SLA QoS monitoring process and the QoS evaluation process, records user service startup and service level information, and reports to the service-specific server the SLA parameters corresponding to the user's current service level (namely, the set default service level or the service level currently required by the user, which may be included in the service request). The service-specific server provides differentiated services according to the SLA parameters. The SLA QoS monitoring process and the QoS evaluation process may be: collecting service performance parameters from the communication network, and viewing whether the network performance parameters meet the SLA parameters according to the comparison between the service performance parameters and the SLA parameters. For the detailed SLA QoS monitoring method and QoS evaluation method, see the Chinese Patent Application No. 200510097473.9 and No. 200610057851.5, filed with the Chinese Patent Office, the contents of which are not described further here. Each of Chinese Patent Application Nos. 200510097473.9 and 200610057851.5 is hereby incorporated by reference in its entirety and for everything it teaches.

Step 36: The user requests the SLA server to change the current service level through the user system as required. The request carries a user identity and a service level identity (namely, the SLA number shown in FIG. 2). According to the foregoing service level identity, the SLA server may search the SLA database to determine the service level to be changed as required in the foregoing user request. In practice, the process may be, without limitation to: The user sends a service change request to the SLA server, and the SLA server queries the SLA database about the user's SLA service level information, returns the information to the user, and feeds back all optional service level information to the user through a list on the user system. The user selects a service level as required, and submits the selected service level to the SLA server; or the user sends a request to the SLA server, wherein the request carrying information about a service level.

Steps 37-38: After receiving the request for changing the service level, the SLA server performs processing, including: According to the service level identity and the user identity, the SLA server searches the SLA database and determines the SLA parameters corresponding to the updated service level, and notifies the service-specific server to provide services for the user according to the SLA parameters of the new service level. Alternatively, the SLA server may notify the service-specific server of the updated service level directly, and the service-specific server queries the SLA database about the SLA parameters corresponding to the service level.

Steps 39-310: After receiving the message for changing the service level inclusive of the new SLA parameters sent by the SLA server through an interface, the service-specific server performs internal processing according to the service requirements, including: The service-specific server sets a service priority and provides services for the user according to the new SLA parameters, charges the user and handles SLA violation according to the new service level; and finally notifies the SLA server that the service level is changed successfully.

Steps 311-312: After receiving the message indicative of success of changing the service level sent from the service-specific server, the SLA server performs internal processing, including: The SLA server monitors the SLA and evaluates the QoS according to the changed service level, stores the service level change information to the service information database, and then notifies the user system that the service level is changed successfully.

Step 313: The user sends a service finish request when the current service is terminated (or the service-specific server detects that the current service of the user is terminated according to a certain mechanism). The service-specific server sends a request for stopping SLA monitoring to the SLA server. The SLA server performs internal processing to finish the service, including: The SLA server terminates the SLA monitoring and evaluation process for the user, records the service stop information, and releases the resources related to the user's SLA monitoring and evaluation.

Figure 4:
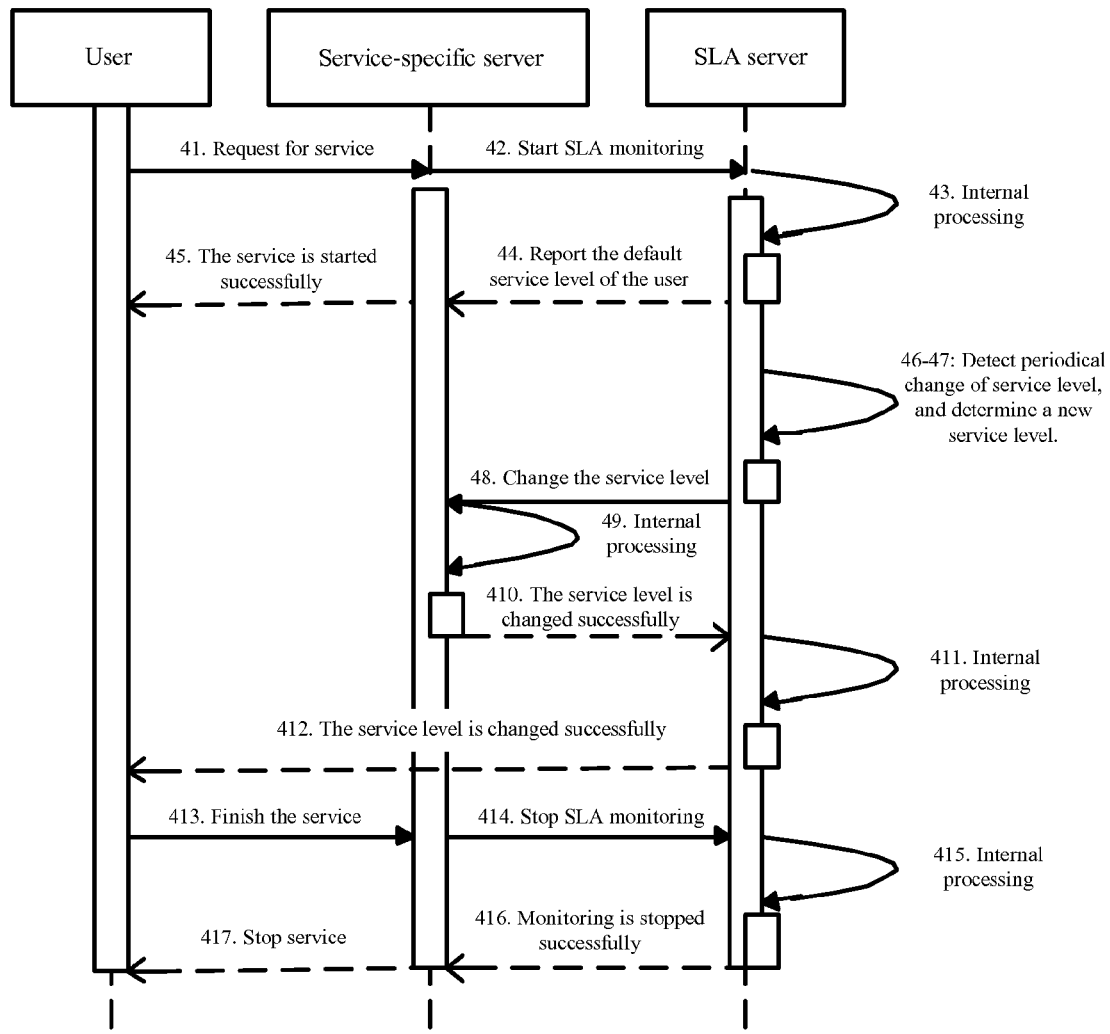
FIG. 4 is a flowchart of the method provided in a third embodiment of the invention.

The method according to the third embodiment of the present invention is about a scenario where the network changes the service level automatically according to a preset policy. The preset policy is to provide different levels of service in fixed time segments. FIG. 4 is a flowchart of the method provided in the third embodiment of the invention. The following steps are consistent with the equivalent steps of the first embodiment shown in FIG. 3: The user requests a service, the service-specific server handles the change of a service level, and the SLA server handles the change of a service level, and the service is terminated. That is, steps 41-45 are equivalent to steps 31-35 in the first embodiment; and steps 48-417 are equivalent to steps 38-317 in the first embodiment. The difference lies in steps 46-47: After receiving the message for starting SLA monitoring for a specific user sent from the service-specific server, the SLA server detects the SLA information periodically for the user to check whether any plan of changing the SLA service level exists (for example, by starting an independent thread for the user to retrieve the SLA database information). When the SLA server detects that the service level needs to be changed by time, the SLA server starts internal processing, including: The SLA server judges whether the service level needs to be changed; and if the service level needs to be changed, determines a new service level, searches out the SLA parameters corresponding to the new service level, and sends a message for changing the service level to the service-specific server.

The method according to the fourth embodiment of the present invention is a combination of the foregoing first embodiment which updates the service level in real time and the foregoing second embodiment which updates the service level periodically. In the fourth embodiment, when the user does not select a service level in real time, the server provides different levels of service in different time segments according to the service levels set in the periodical mode; when the user selects a service level in real time, the server provides the level of service specified in real time before termination of the current service and ignores the service level set in the periodical mode.

Figure 5:
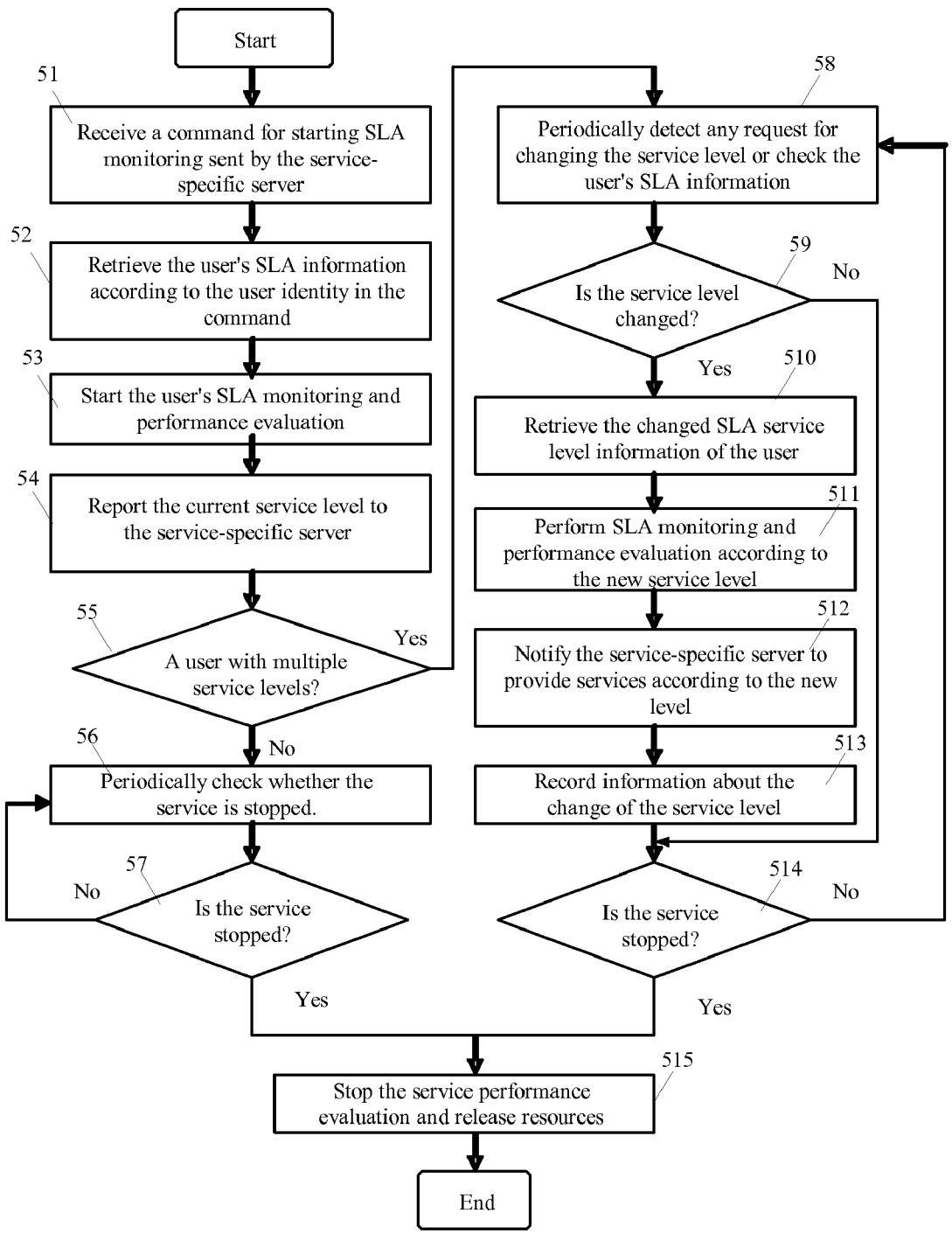
FIG. 5 illustrates the internal processing flow of a SLA server provided in an embodiment of the present invention.

FIG. 5 shows the internal processing flow of a SLA server provided in an embodiment of the present invention, including:

Step 51: After startup, the SLA server starts a service process for listening to the service request. After receiving a command for starting SLA monitoring sent by the service-specific server (the command includes at least a user identity for identifying the current user), the SLA server starts a SLA service thread for the current user.

Step 52: According to the user identity in the SLA monitoring command, the SLA service thread retrieves the user's SLA information.

Step 53: According to the user's SLA information, the SLA server starts the related SLA monitoring and evaluation thread. The SLA monitoring and evaluation may be based on the prior art.

Step 54: The SLA server reports the user's service level information in the SLA information to the service-specific server. The service-specific server provides the user with the service at a corresponding level according to the SLA service level information.

Step 55: The SLA service thread checks whether the user has subscribed to multiple service levels according to the user's SLA information, and if the user has subscribed to multiple service levels, proceeds to step 58; otherwise, proceeds to step 56.

Steps 56-57: The SLA service thread manages the SLA monitoring and evaluation thread, and periodically checks whether a command for stopping SLA monitoring is issued by the service-specific server. When receiving such a command, the SLA service thread proceeds to step 515, that is, terminates the SLA monitoring and evaluation thread, and releases the resources occupied by it and other related resources to finish the process.

Steps 58-59: The SLA service thread starts to periodically detect the request for changing the service level and/or SLA information to capture the user's service level change event (including: event of requesting change of the service level, and event of changing the service level by time segments). The service level change event includes at least a service level identity for identifying the new service level. The foregoing level identity information can be used to search the SLA database and obtain the corresponding SLA service parameters. In practice, a mechanism may be used to ensure that the corresponding SLA service parameters in the SLA database can be retrieved by using the level identity information. An example of such mechanisms is: Before the user sends a request for changing the service level, the server provides optional service levels for the user to select; when necessary, the service level change event should include a user identity for identifying the current service user. After detecting the foregoing service level change event, the service thread on the SLA server determines whether to change the service level. For example, according to a convention, the event of changing the service level by time segments that occurs after the user requests to change the service level through real-time interaction will be ignored. If the change of the service level is executed, the SLA server proceeds to step 510; otherwise, proceeds to step 514.

Step 510: The SLA server searches the SLA database to obtain new SLA QoS information of the changed service level of the user, including SLA parameters.

Step 511: The SLA server performs SLA monitoring and QoS evaluation according to the SLA parameters corresponding to the new SLA service level.

Steps 512-513: By interacting with the service-specific server through an interface, the SLA server notifies the service-specific server to provide services according to the new service level. The notification carries the SLA parameters corresponding to the new service level. The SLA server records information about the change of the service level into the service information database.

Step 514: The service thread checks whether a command for stopping SLA monitoring is issued by the service-specific server. When receiving such a command, the service thread proceeds to step 515, that is, terminates the SLA monitoring and evaluation thread, and releases the resources occupied by it and other related resources to finish the process. When no such command is received, the service thread returns to step 58.

Besides, in practice, the current resources of the SP may be deficient for fulfilling the user request when the user switches from a low service level to a high service level. In this case, the SP may negotiate with the user about the processing mode. For example, when the user switches to a high service level successfully, the SP ensures that the SLA of this service level is fulfilled successfully and handles the SLA violation according to this service level. Generally, the SP only ensures to provide services according to the lowest service level or the default service level in the user's SLA.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection of the present invention.

What is claimed is:

1. A method for ensuring quality of service (QoS), the method comprising:
   querying service level agreement (SLA) information according to a user identity, wherein the SLA information includes different service levels signed by a user with the user identity;
   obtaining a service level from the different service levels; and
   notifying a service-specific server to provide services for the user according to the obtained service level;
   checking whether the user has subscribed to multiple service levels according to the SLA information of the user, and if the user has subscribed to the multiple service levels,
   monitoring, during the process of providing the services for the user by the service-specific server, a service level change event for the user through periodically detecting a request for changing at least one of the multiple service levels and the SLA information, wherein the service level change event comprising a service level identity for identifying a new service level and the user identity;
   querying the SLA information according to the user identity in the service level change event and obtaining the new service level from the different service levels according to the service level identity, when the service level change event occurs; and
   notifying the service-specific server to provide the services for the user according to the new service level.

2. The method of claim 1, wherein the SLA information comprises an SLA which includes the different service levels.

3. The method of claim 1, wherein the SLA information comprises more than one SLA and each of the SLAs comprise one service level.

4. The method of claim 1, further comprising:
   ensuring the QoS of the user according to the obtained service level.

5. The method of claim 1, wherein the notifying the service-specific server to provide the services for the user according to the obtained service level comprises:
   obtaining SLA parameters according to the obtained service level;
   notifying the service-specific server to provide the services for the user according to the obtained SLA parameters.

6. The method of claim 1, wherein charging information corresponding to the obtained service level in the SLA information of the user is used to charge.

7. The method of claim 4, further comprising:
   storing the service level change information after the service level is changed.

8. The method of claim 4, wherein the ensuring the QoS of the user according to the obtained service level comprises:
   obtaining SLA parameters according to the obtained service level;

performing SLA QoS monitoring and SLA QoS evaluation for the service according to the obtained SLA parameters.

9. A system for ensuring quality of service QoS, the system comprising:

a service level agreement (SLA) server, configured to query SLA information according to a user identity obtain a service level from the SLA information, and to notify a service-specific server of providing services for a user according to the obtained service level; wherein the SLA information comprises different service levels signed by the user with the user identity; and the service-specific server, configured to notify the SLA server upon receiving a service request from the user, receive a notification from the SLA server, and provide the user with the service at a corresponding service level;

wherein the SLA server is further configured to check whether the user has subscribed to multiple service levels according to the SLA information of the user, and if the user has subscribed to multiple service levels, monitor, during the process of providing the services for the user by the service-specific server, a service level change event for the user through periodically detecting a request for changing at least one of the service levels and the SLA information, wherein the service level change event comprises a service level identity for identifying a new service level and the user identity;

query the SLA information according to the user identity in the service level change event and obtain the new service level from the different service levels according to the service level identity, when the service level change event occurs; and notify the service-specific server to ensure the QoS of the user according to a changed service level after detecting the service level change event.

10. The system of claim 9, further comprising an SLA database, configured to store relationship between the user identity and the SLA information, wherein:

the SLA server obtains the SLA information according to the user identity by searching the SLA database.

11. The system of claim 9, wherein the SLA information comprises an SLA which includes the different service levels.

12. The system of claim 9, wherein the SLA information comprises more than one SLA and each of the SLAs comprises one service level.

13. The system of claim 9, further comprising: a service information database for storing service-related information, wherein the SLA server is further configured to record the service level change information into the service information database after the service level is changed.

14. The system of claim 9, further comprising:

a service performance database, configured to store information about the service performance of the current communication network collected by a collection device in the communication network; and the SLA server comprises an SLA monitoring and evaluation module, configured to query the service performance database about the service performance of the current communication network, monitor and evaluate the SLA QoS for the service according to the service level of the user and the found service performance information.

15. A service level agreement (SLA) server, comprising:

a user interface module, adapted to provide a uniform user-oriented interface to change a current service level or change SLA-related parameters in SLA information by a user; wherein the SLA information includes different service levels signed by user with a user identity;

a querying module, adapted to query the SLA information according to the user identity from the user interface module, and obtain a service level from the SLA information;

a service level processing module, adapted to check whether the user has subscribed to multiple service levels according to the SLA information of the user, and if the user has subscribed to the multiple service levels, monitor, during the process of providing the services for the user by the service-specific server, a service level change event for the user through periodically detecting a request for changing at least one of the service level and the SLA information, wherein the service level change event comprises a service level identity for identifying a new service level and the user identity;

query the SLA information according to the user identity in the service level change event;

obtain the new service level from the different service levels according to the service level identity, when the service level change event occurs; and instruct the service-specific server to provide the user with the services according to the new service level.

16. A method for ensuring quality of service (QoS), the method comprising:

checking whether a user has subscribed to multiple service levels according to a user's Service level agreement (SLA) information, and if the user has subscribed to multiple service levels, monitoring, during the process of providing services for the user by a service-specific server, a service level change event for the user through periodically detecting a request for changing at least one of the service levels and the SLA information;

determining a service level to be changed according to the SLA information when detecting that the service level change event occurs; wherein the SLA information includes different service levels signed by a user with a user identity;

notifying the service-specific server to provide the services for the user according to a changed service level;

wherein the service level change event comprises receiving a request for changing the service level, and the request comprises the user identity and a service level identity for identifying a service level to be changed;

wherein determining the service level to be changed comprises querying the SLA information according to the user identity and the service level identity; and obtaining SLA parameters corresponding to the service level to be changed;

wherein notifying the service-specific server to provide services for the user according to a changed service level comprises: notifying the service-specific server to provide the services for the user according to the service level to be changed corresponding to the SLA parameters obtained.

17. The method of claim 16, further comprising:

performing SLA QoS monitoring and SLA QoS evaluation for the service according to the obtained SLA parameters.

* * * * *